United States Patent [19]
Niccum

[11] Patent Number: 5,947,401
[45] Date of Patent: Sep. 7, 1999

[54] MOTION PICTURE FILM PLATTER ASSEMBLY FOR THEATRES

[76] Inventor: Richard E Niccum, 502 W. 10th St., Upland, Calif. 91786

[21] Appl. No.: 08/949,671

[22] Filed: Oct. 14, 1997

[51] Int. Cl.⁶ .............................. B65H 59/38; G03B 1/32
[52] U.S. Cl. ........................................ 242/334; 242/328.2
[58] Field of Search ................................. 242/328, 328.1, 242/328.2, 334, 334.1, 418.1, 420.5, 420.6

[56] References Cited

U.S. PATENT DOCUMENTS

| | | | |
|---|---|---|---|
| 3,780,959 | 12/1973 | Burth | 242/328.2 |
| 3,823,890 | 7/1974 | Potts | 242/328.2 |
| 4,169,566 | 10/1979 | Boudouris et al. | 242/328.2 |
| 4,671,467 | 6/1987 | Burth | 242/328.2 |
| 5,189,451 | 2/1993 | Bredin | 242/328 |

*Primary Examiner*—John P. Darling
*Attorney, Agent, or Firm*—Charles C. Logan, II

[57] ABSTRACT

A motion picture film platter assembly having a base, an upright oriented post and at least three vertically spaced support arms. A hub-shaped case is supported on the top surface of each of these support arms. A cylindrical platter having a central bore hole is journaled on an external annular flange of the hub-shaped case and the upper cylindrical wall of the hub-shaped case passes through the bore hole of the circular platter. Each platter has its own drive motor for rotating it. A modular film feed-out unit is removably positioned in the bore hole of one of the circular platters. The film feed-out unit has a top plate and mounted at predetermined positions thereon are a pair of 35 mm or 70 mm film idler rollers and an upright oriented film proximity sensor that is laterally spaced from an upright oriented first keeper roller. A reel of film mounted on the top surface of the circular platter has its front end threaded between the film proximity sensor and the first keeper roller and then around the first and second 35 mm film idler rollers after which the film strip travels to the movie projector. The motors are electrically connected to their respective film proximity sensors so that as the surface of the film strip approaches the film proximity sensor, the motor increases the rotation of its circular platter and when the surface of the film strip travels away from the film proximity sensor the motor rotates the circular platter slower.

10 Claims, 4 Drawing Sheets

MOTION PICTURE FILM PLATTER ASSEMBLY FOR THEATRES

BACKGROUND OF THE INVENTION

The invention relates to motion picture projectors and more specifically to the motion picture film platter assemblies that are used in the projection rooms.

Up until about twenty years ago, the projection rooms in movie theaters required two projectors to show a movie film. The first projector ran the first reel of the movie and the second projector ran the next reel of film and if it was an exceptionally long movie the first projector was used again. In the past each reel was good for 30 to 40 minutes of viewing time. Before the projectionist removed the first reel he would rewind it so it would be ready for its next use.

Improvements in the film industry have produced motion picture film platter assemblies having two or more vertically spaced circular platters. These platters are approximately 48 inches in diameter and they support a large reel of film that has been spliced together from several reels of film of a movie picture. This produces a reel that can run 4 to 5 hours. This eliminated the need for a projectionist to use two projectors and eliminated rewinding and setting up the next reel during the running of a movie film. Also the take-off of the film strip from the reel would be from its inner perimeter and it would be returned from the projector and wound onto the outer surface of a center ring on another of the circular platters after it has passed through the projector. This eliminated the need for a projectionist to rewind films after they were shown.

The problem with existing motion picture film platter assemblies is the structure on the film feed-out unit that is removably positioned in the center of the circular platter. These film feed-out units have a swing arm having a roller mounted adjacent its outer end around which the film strip passes prior to passing through a series of a 35 mm or 70 mm film idler rollers. The distance that the swing arm can pivot is controlled by the spacing of keeper rollers positioned on both sides of the swing arm. The film projector pulls the film through at a constant speed. Since the diameter of the film being fed out on the platter changes throughout its 4 or 5 hours showing, it is necessary, that the speed of the platter be coordinated with the projector's speed so it does not damage the film by having a build-up of film on the reel and rubbing of the film against itself. It is the job of the swing arm to take into account the change in diameter of the film being fed out. As the swing arm travels between maximum allowable rotation to the left and maximum rotation to the right, electrical signals are sent to the motor for the circular platter directing it to speed-up or slow-down the rotation of the circular platter.

The present day film feed-out units are not entirely satisfactory and occasional build-up of film results in portions of the film strip rubbing against itself and causing surface damage.

It is an object of the invention to provide a novel film feed-out unit that eliminates the structure of a pivoting film guidance arm.

It is also an object of the invention to provide a novel film feed out unit that eliminates costly film surface damage that results in the existing film feed-out units.

It is another object of the invention to provide a novel film feed-out unit that eliminates mechanical structure and replaces it with an improved film proximity sensor.

It is an additional object of the invention to provide a novel film feed-out unit that has fewer mechanical parts thereby reducing maintenance and down-time.

SUMMARY OF THE INVENTION

The novel film feed-out unit is a modular unit that can be inserted and removed from the center of any of the circular platters mounted on their support arms. The cup-shaped base of the unit seats into the open top of the hub-shaped case that supports the circular platter. It is secured to the hub-shaped case so that neither it or the hub-shaped case rotates.

The film feed-out unit has a feed-out plate having a top surface that is positioned substantially flush with the top surface of the circular platter into which it has been inserted. An upright oriented film proximity sensor is mounted on the top surface of the feed-out. The film proximity sensor is an electric eye that has two vertically stacked apertures along one of its specific side vertical surfaces. Positioned a predetermined spaced distance from the film proximity sensor is a keeper roller mounted on a shaft extending up from the top surface from the feed-out.

The film proximity sensor transmits an infrared signal toward the film passing between it and the keeper roller. The second aperture of the film proximity sensor receives the reflection back from the film. As the film passing between travels further away from the film proximity center, an electrical signal is sent to the drive motor for the circular platter telling it to slow down its speed of rotation. As the film passing between the film proximity sensor and the keeper roller comes closer to the film proximity sensor, a signal is sent to the drive motor telling it to increase the speed of rotation of the circular platter. These signals are generated and sent independent of ambient lighting conditions. In this manner excess build-up is prevented thereby avoiding damage to the surface of the film since it is not able to rub against other portions of the film.

After the film passes between the film proximity sensor and the keeper roller, it is directed around a series of 35 mm film idler rollers and then on to the projector. After the film passes through the projector it is sent back to the motion picture platter assembly and directed to a take-up ring that is mounted in the center of one of the circular platters. The take-up ring is easily removed and transferred to any of the circular platters when it is needed to rewind the film that has passed through the projector.

DESCRIPTION OF THE PREFERRED EMBODIMENT

Figure 1:
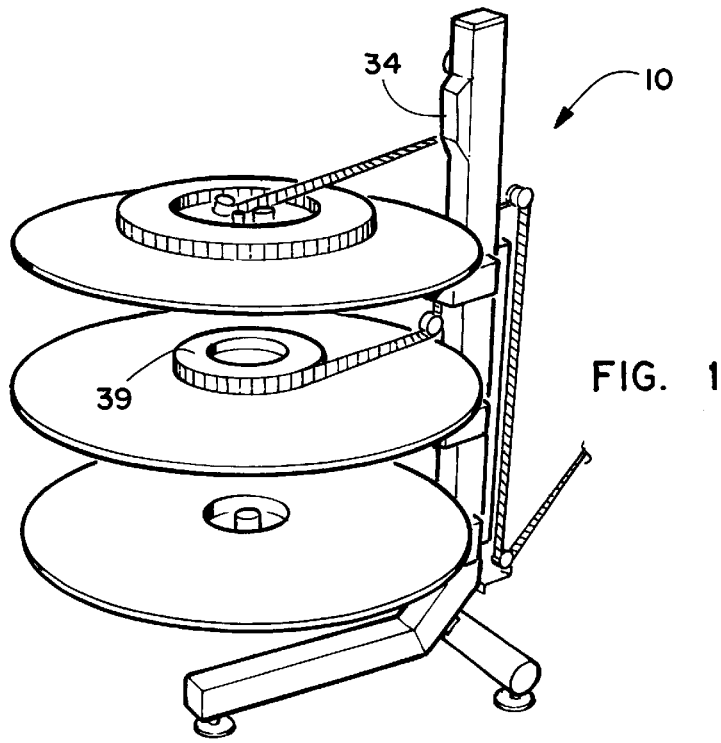
FIG. 1 is a front perspective view of the motion picture film platter assembly.
Figure 2:
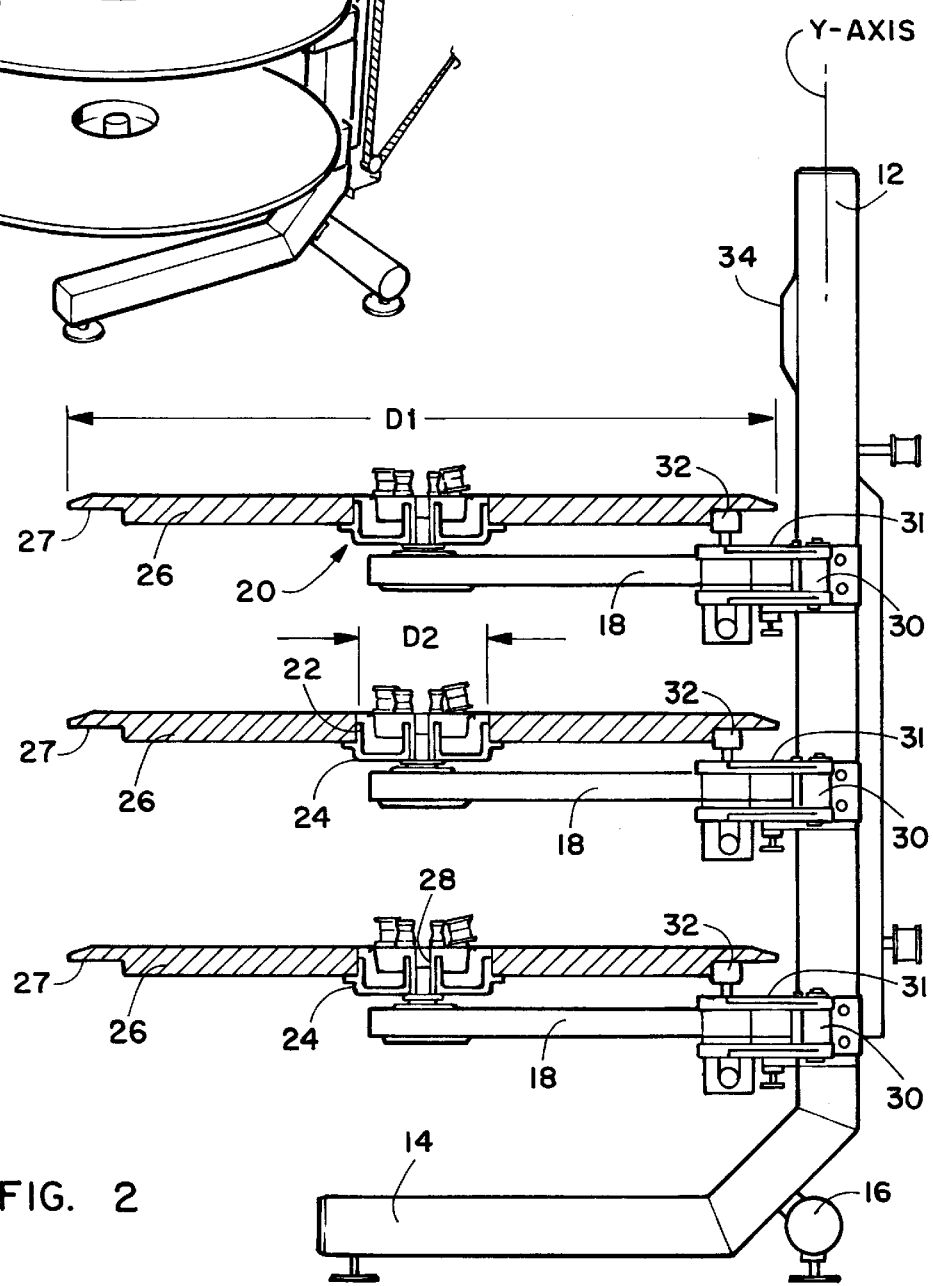
FIG. 2 is a schematic side elevation view of the motion picture film platter assembly.
Figure 3:
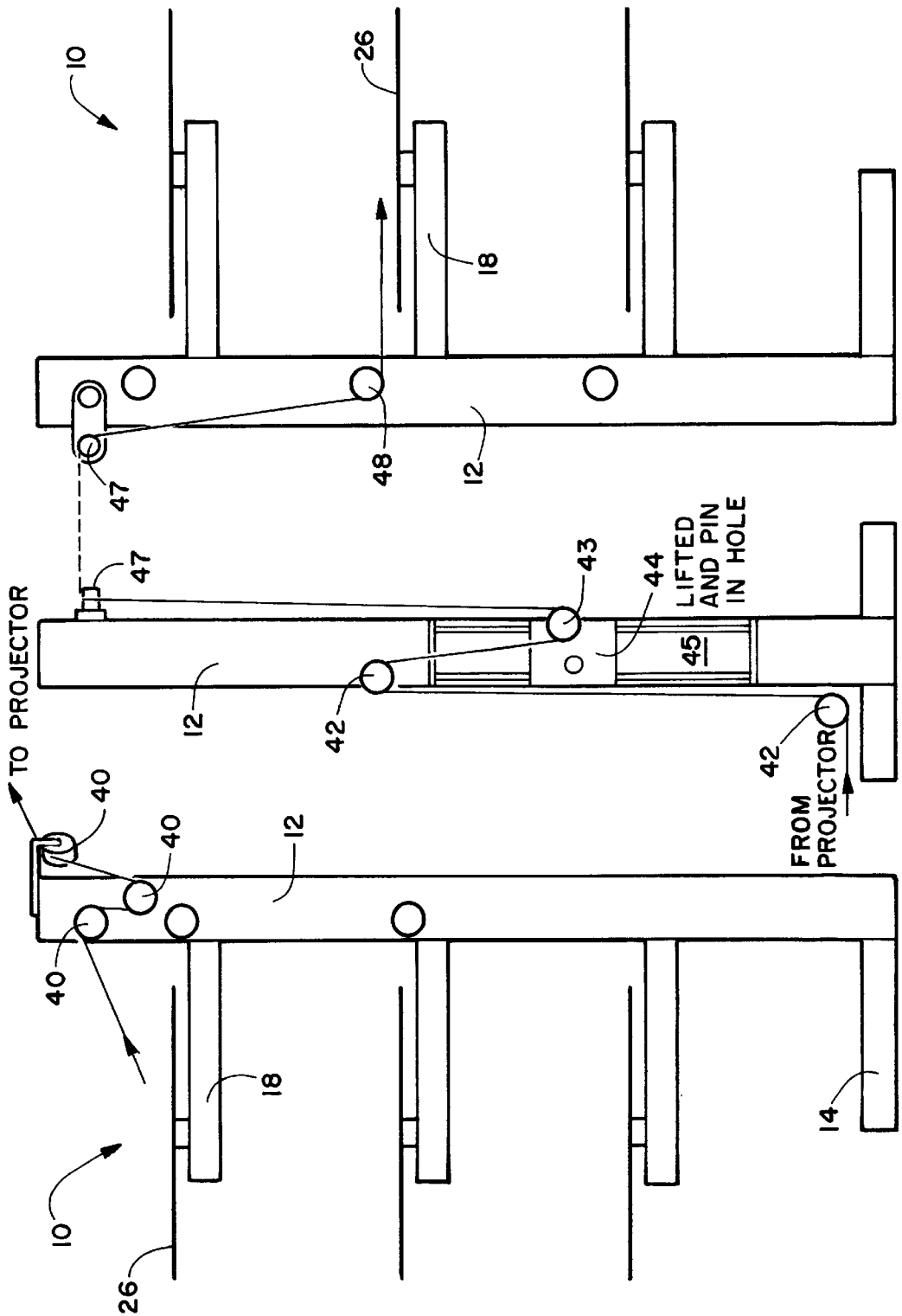
FIGS. 3A–3C are schematic illustrations showing the manner in which the motion picture film is taken from the motion picture film platter assembly and transferred to the projector and then later returned from the projector to the motion picture film platter assembly.

The motion picture film platter assembly and its novel film feed-out unit will now be described by referring to FIGS. 1–6 of the drawings. The motion picture film platter assembly is generally designated numeral 10 and it has a post 12 having a longitudinally extending Y-axis. A base 14 is connected to the bottom end of post 12 and a base cross member 16 is also secured to base 14.

A plurality of support arms 18 have their one end connected to post 12. Each has a hub-shaped case 20 supported on the top surface of the support arms 18 adjacent their free end by suitable mechanical hardware that prevents rotation of the hub-shaped cases 20. The hub-shaped cases 20 have a cylindrical drum portion 22 and an annular flange 24 extends outwardly from its outer surface.

Circular platter 26 has a diameter D1 in the range of 30–60 inches. It has a flat top surface and it has an annular relieved shoulder 27 on its bottom surface. It has a central bore hole 28 having a diameter D2. Circular platter 26 receives the top end of cylindrical drum portion 22 into its bore hole 28 and suitable conventional bearing structure on the top surface of annular flange 24 allows circular platter 26 to freely rotate about hub-shaped case 20.

Each support arm has its own motor 30 mounted on post 12 that drives a V belt 31 that in turn powers a drive wheel 32 that contacts the annular relieved shoulder 27 of circular platter 26. The support arms 18 and post 12 are made of hollow tubular material that allow the necessary wiring harnesses and electrical wires to be threaded therethrough.

There is automatic switching that senses by roller position, which platter 26 is threaded for feed-out, take-up or make-up and automatically routes signals to corresponding motors. The LED display 34 indicates this routing as well as the readiness status of the feed-out and take-up sensors. Each platter 26 can also be externally controlled for make-up and other purposes.

Figure 4:
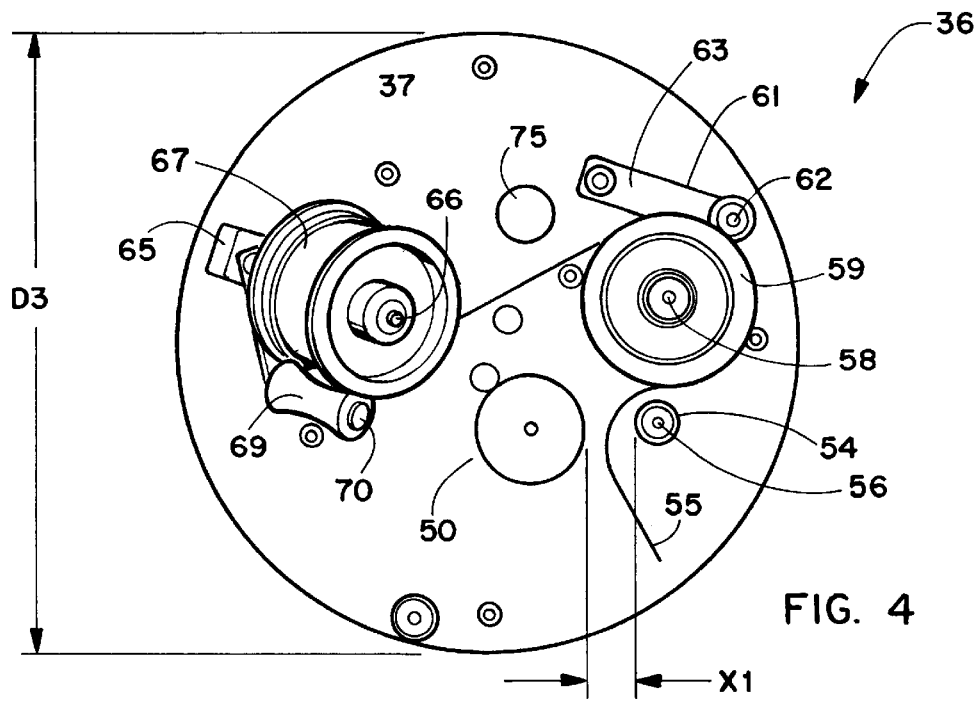
FIG. 4 is a top plan view of the novel film feed-out unit.
Figure 5:
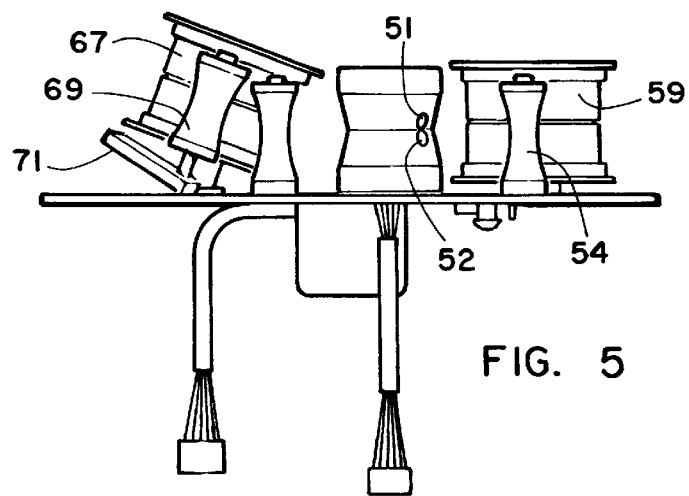
FIG. 5 is a side elevation view of the novel film feed-out unit with its cup-shaped base removed.
Figure 6:
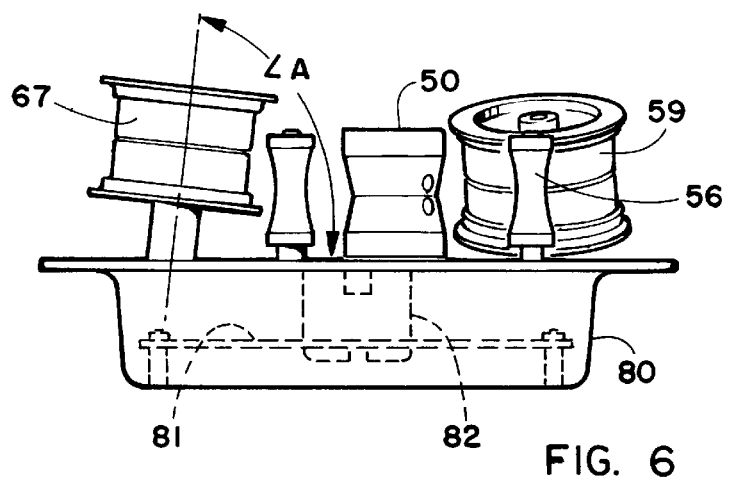
FIG. 6 is a side elevation view of the novel film feed-out unit.

The film feed-out unit 36 is best illustrated in FIGS. 4–6. It has a feed-out top plate 37 having a diameter D3 and D3 is less than D2 so that plate 37 can nest in bore hole 28 of circular platter 26. When mounted in its proper position, plate 37 is stationary and does not rotate.

Film feed-out unit 36 is a modular unit and it can be moved from one platter to another when it is desired to show a quantity of film from that particular platter. Likewise a take-up ring 39 (such as illustrated in FIG. 1 on the middle platter) can be moved from one platter to another when it is desired to receive the film from the projector and wind it on to that specific platter.

FIGS. 3A–3C are a series of schematic elevation views taken from different sides of the motion picture film platter assembly 10. In FIG. 3A, film is taken off a four to five hour reel supported on top platter 26. The film then passes around several rollers 40 and travels to the projector for viewing. In FIG. 3B, the film returns from the projector and travels around rollers 42 and then around roller 43 (which is mounted on a carriage 44 that travels upwardly and downwardly on tracks 45). The film next travels around roller 47 and FIG. 3C shows it passing around roller 48 after which it is wound upon a take-up ring 39 that has been removably secured on the top surface of middle circular platter 26.

Secured to the top surface of plate 37 of the film feed-out unit 36 is a film proximity sensor 50 having an upper aperture 51 and a lower aperture 52. Spaced a predetermined distance X1 therefrom, is a keeper roller 54 mounted on a shaft 56. X1 is in the range of ½ inch to 3 inches. A shaft 58 also extends upwardly from the top surface of plate 37 and a 35 mm or 70 mm film idler roller 59 is journaled thereon. A keeper roller 61 mounted on a shaft 62 is supported on a keeper spring loaded arm 63. An angled mounting block 65 has a shaft 66 extending upwardly therefrom and a 35 mm or 70 mm film idler roller 67 is journaled thereon. A keeper roller 69 is mounted on a post 70 that itself is mounted on a spring loaded arm 71.

A film motion sensor 75 is located on the feed-out plate 37 and it senses whether film is being demanded by the projector. If not, it shuts off the motor controlling that platter. This is helpful in stand-by conditions and other stopped conditions in eliminating platter or dish creep or run-away should the stopped film inadvertently move close to proximity sensor 50.

Film to be fed through the projector is taken off the inner perimeter of the film reel and threaded between sensor 50 and keeper roller 54. The film then travels around idler rollers 59 and 67 after which it travels to the projector. The film passing through the projector is going at a constant speed but the speed of rotation of the platter has to be varied due to the changing diameter of the film as it comes off the reel. As the film passing between sensor 50 and keeper roller 54 moves either toward the sensor or toward keeper roller 54, it is necessary that the drive motor of that particular platter have its speed changed or stopped periodically to coordinate with the speed of the film passing through the projector. The film proximity sensor 50 is an electrical eye that sends an infrared signal out through top aperture 51 toward the film passing in front of it. The infrared receiver aperture 52 receives the reflection that travels back off of the film. The data that is provided by this sensor is then used to electrically adjust the speed of the motor driving the circular platter.

Film feed-out unit 36 has a cup-shaped base 80 and has a circuit board 81 mounted therein. A hub 82 extending downwardly from plate 37 telescopes into mating structure of hub-shaped case 20.

Figure 7:
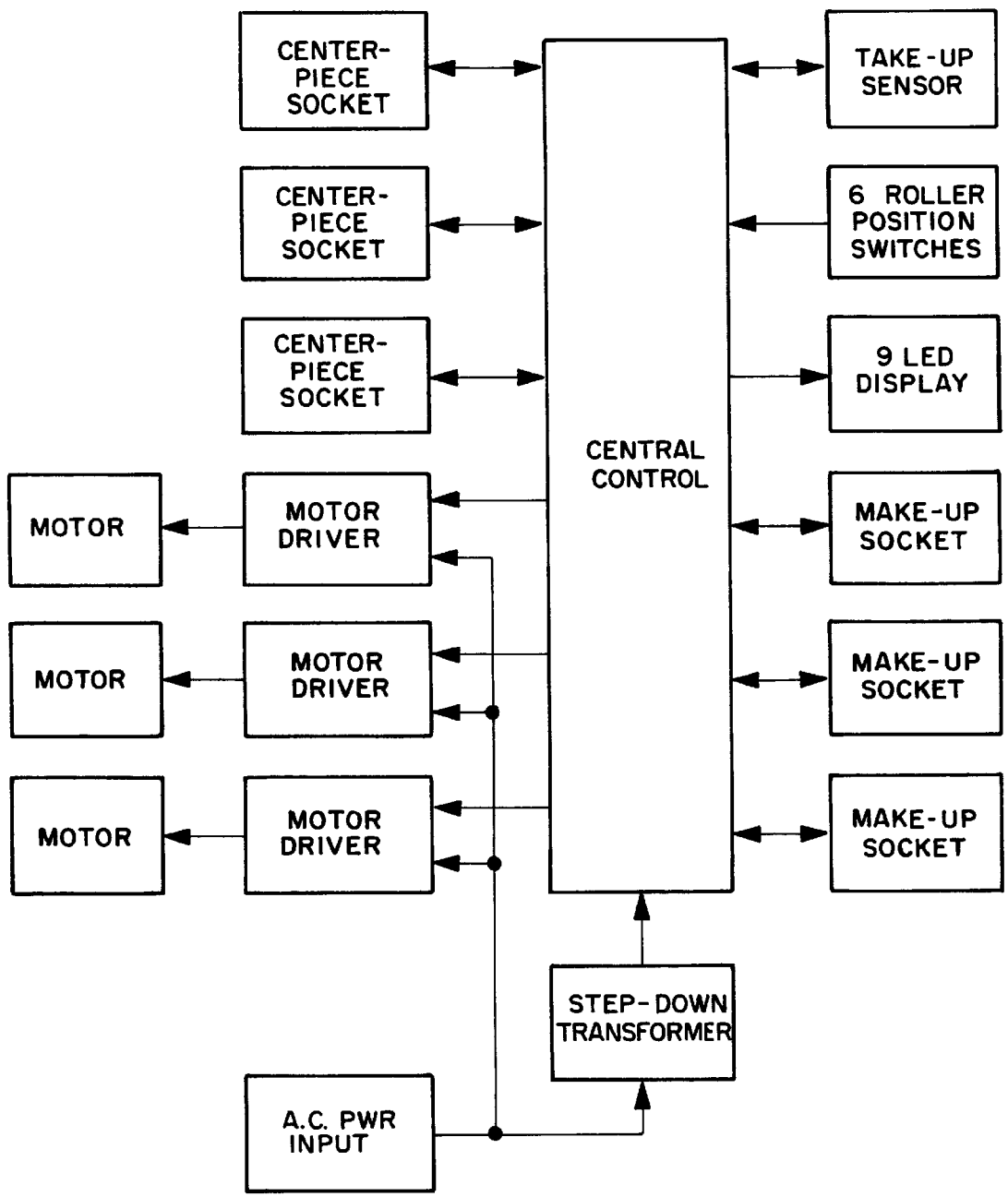
FIG. 7 is a block diagram of the electrical circuit of the notion picture film platter assembly.

FIG. 7 is a block diagram of the electrical circuit of the motion picture film platter assembly. There is a center-piece socket for each platter 26. The take-up sensor controls the take-up speed of the platter and is independent of the feed-out speed. Each platter 26 can also be externally controlled for film make-up by plugging into that particular platters make-up socket.

What is claimed is:

1. A motion picture film platter assembly comprising:

an elongated upstanding post having a top end and a bottom end; a base secured to said bottom end of said post; said post having a longitudinally extending Y-axis;

an elongated first support arm having a top surface, a front end and a rear end; said rear end being connected to said post at a predetermined height; a hub-shaped case having an open top surface and means for supporting said hub-shaped case on said top surface of said first support arm adjacent its front end; said hub-shaped case having an outer cylindrical surface with an annular flange extending outwardly therefrom; a first circular platter having a diameter D1, a substantially flat top surface, a bottom surface, a peripheral edge and a central bore hole having a diameter D2; said first circular platter being rotatably supported on said annular flange of said hub-shaped case; a first motor having means for rotating said first circular platter and means for electrically connecting said first motor to a source of electricity;

an elongated second support arm having a top surface, a front end and a rear end; said rear end being connected to said post at a predetermined height; a hub-shaped case having an open top surface and means for supporting said hub-shaped case on said top surface of said second support arm adjacent its front end; said hub-shaped case having an outer cylindrical surface with an annular flange extending outwardly therefrom; a second circular platter having a diameter D1, a substantially flat top surface, a bottom surface, a peripheral edge and a central bore hole having a diameter D2; said second circular platter being rotatably supported on said annular flange of said hub-shaped case; a second motor having means for rotating said second circular platter and means for electrically connecting said second motor to a source of electricity;

at least one film feed-out unit having a top plate having a diameter D3 and D3 is less than D2 so that said top plate can nest in the bore hole of one of said circular platters; said top plate having a top surface and a bottom surface; an upright oriented film proximity sensor mounted on said top surface of said top plate and said film proximity sensor is spaced a predetermined distance X1 from an upright oriented first film keeper roller that is mounted on a first upright shaft extending upwardly from said top surface of said top plate; an upright oriented second shaft extending upwardly from said top surface of said top plate and a first film idler roller is journaled thereon; an upright oriented third shaft having a longitudinal axis that makes an acute angle with said top surface of said top plate and means for securing said third shaft to said top surface of said top plate, a second film idler roller journaled on said third shaft; said film proximity sensor, said first keeper roller and said first and second film idler rollers being positioned at predetermined locations on said top plate to provide a film path that first travels between said film proximity sensor and said first keeper roller, the film path then travels around at least a major portion of said first film idler roller and then around a major portion of said second film idler roller after which the film would be led off to a movie projector.

2. A motion picture film platter assembly as recited as in claim 1 wherein said post is made of tubular material so that electrical wiring can be threaded therethrough.

3. A motion picture film platter assembly as recited as in claim 1 wherein said support arms are made of tubular material so that electrical wiring can be threaded therethrough.

4. A motion picture film platter assembly as recited as in claim 1 wherein there are at least three support arms and each support a hub-shaped case and a circular platter.

5. A motion picture film platter assembly as recited as in claim 1 further comprising a film speed control carriage and means for mounting it on said post.

6. A motion picture film platter assembly as recited as in claim 1 further comprising a take-up ring and means for detachably securing it to said top surface of any of said circular platters.

7. A motion picture film platter assembly as recited as in claim 1 wherein said film feed-out unit is a modular unit.

8. A motion picture film platter assembly as recited as in claim 1 wherein said film proximity sensor has an electric eye unit having a pair of vertically stacked apertures, one aperture functions as a sender that emits an infrared beam toward the surface of a strip of film passing in front of it and said other aperture functions as a receiver for reading the reflection of the infrared beam off of the surface of the strip of film.

9. A motion picture film platter assembly as recited in claim 8 wherein said first motor having means for rotating said circular platter is electrically connected to said film proximity sensors so that as the surface of the film strip approaches said film proximity sensor, said first motor slows the rotation of said circular platter and when the surface of the film strip travels away from said film proximity sensor said first motor rotates said circular platter faster.

10. A motion picture film platter assembly comprising:

an elongated upstanding post having a top end and a bottom end; a base secured to said bottom end of said post; said post having a longitudinally extending Y-axis;

an elongated first support arm having a top surface, a front end and a rear end; said rear end being connected to said post at a predetermined height; a hub-shaped case having an open top surface and means for supporting said hub-shaped case on said top surface of said first support arm adjacent its front end; said hub-shaped case having an outer cylindrical surface with an annular flange extending outwardly therefrom; a first circular platter having a diameter D1, a substantially flat top surface, a bottom surface, a peripheral edge and a central bore hole having a diameter D2; said first circular platter being rotatably supported on said annular flange of said hub-shaped case; a first motor having means for rotating said first circular platter and means for electrically connecting said first motor to a source of electricity;

an elongated second support arm having a top surface, a front end and a rear end; said rear end being connected to said post at a predetermined height; a hub-shaped case having an open top surface and means for supporting said hub-shaped case on said top surface of said second support arm adjacent its front end; said hub-shaped case having an outer cylindrical surface with an annular flange extending outwardly therefrom; a second circular platter having a diameter D1, a substantially flat top surface, a bottom surface, a peripheral edge and a central bore hole having a diameter D2; said second circular platter being rotatably supported on said annular flange of said hub-shaped case; a second motor having means for rotating said second circular platter and means for electrically connecting said second motor to a source of electricity;

at least one film feed-out unit having a top plate having a diameter D3 and D3 is less than D2 so that said top plate can nest in the bore hole of one of said circular platters; said top plate having a top surface and a bottom surface; an upright oriented film proximity sensor mounted on said top surface of said top plate and said film proximity sensor is spaced a predetermined distance X1 from an upright oriented first film keeper roller that is mounted on a first upright shaft extending upwardly from said top surface of said top plate; an upright oriented second shaft extending upwardly from said top surface of said top plate and a first film idler roller is journaled thereon; an upright oriented third shaft having a longitudinal axis that makes an acute angle with said top surface of said top plate and means for securing said third shaft to said top surface of said top plate, a second film idler roller journaled on said third shaft; said film proximity sensor, said first keeper roller and said first and second film idler rollers being positioned at predetermined locations on said top plate to provide a film path that first travels between said film proximity sensor and said first keeper roller, the film path then travels around at least a major portion of said first film idler roller and then around a major portion of said second film idler roller after which the film would be led off to a movie projector.

* * * * *